US012281961B2

(12) United States Patent
Scheucher et al.

(10) Patent No.: US 12,281,961 B2
(45) Date of Patent: Apr. 22, 2025

(54) TEST BED FOR TESTING A REAL TEST OBJECT IN DRIVING OPERATION

(71) Applicant: AVL LIST GMBH, Graz (AT)

(72) Inventors: Rupert Scheucher, Graz (AT); Peter Schöggl, Hitzendorf (AT); Michael Peinsitt, Wundschuh (AT); Andreas Haas, Hitzendorf (AT); Franz Rabel, Nestelbach bei Graz (AT); Ull Thaler, Graz (AT)

(73) Assignee: AVL List GmbH, Graz (AT)

( * ) Notice: Subject to any disclaimer, the term of this patent is extended or adjusted under 35 U.S.C. 154(b) by 243 days.

(21) Appl. No.: 18/041,524

(22) PCT Filed: Aug. 12, 2021

(86) PCT No.: PCT/AT2021/060281
§ 371 (c)(1),
(2) Date: Feb. 13, 2023

(87) PCT Pub. No.: WO2022/032320
PCT Pub. Date: Feb. 17, 2022

(65) Prior Publication Data
US 2023/0304897 A1    Sep. 28, 2023

(30) Foreign Application Priority Data

Aug. 14, 2020 (AT) .............................. A 50688/2020

(51) Int. Cl.
*G01M 17/013* (2006.01)
*G01M 13/025* (2019.01)
(Continued)

(52) U.S. Cl.
CPC ........ *G01M 17/013* (2013.01); *G01M 13/025* (2013.01); *G01M 15/02* (2013.01); *G01M 17/0074* (2013.01)

(58) Field of Classification Search
CPC ............... G01M 13/025; G01M 15/02; G01M 17/0074; G01M 17/013
See application file for complete search history.

(56) References Cited

U.S. PATENT DOCUMENTS 6,247,348 B1 * 6/2001 Yamakado .......... G01M 17/045
                                                                   73/11.04
10,093,141 B2 * 10/2018 Buisson ................ B60C 99/006
(Continued)

FOREIGN PATENT DOCUMENTS

| AT | 508031 | 10/2010 |
|----|--------|---------|
| DE | 3801647 | 8/1989 |

(Continued)

OTHER PUBLICATIONS

Official Action with Machine Translation for Austria Patent Application No. A 50688/2020, dated May 21, 2021, 7 pages.
(Continued)

*Primary Examiner* — Eric S. McCall
(74) *Attorney, Agent, or Firm* — Sheridan Ross P.C.

(57) ABSTRACT

The invention relates to a test bed and a method for testing a real test object in driving operation, wherein the test object has at least one real component of a vehicle which is capable of applying torque to a wheel hub. The test bed comprises a load machine configured to be connected to the wheel hub so as to transmit torque, an actuator configured to generate a relative movement between the wheel hub on the one hand and a vehicle frame supporting the wheel hub on the other, simulation means for simulating the driving operation, wherein the simulation means is configured to simulate a virtual wheel and dynamics of the virtual wheel as if it were arranged on the wheel hub, and control means configured to operate the real test object in consideration of the simulated dynamics of the virtual wheel on the test bed.

15 Claims, 3 Drawing Sheets

(51) Int. Cl.
*G01M 15/02* (2006.01)
*G01M 17/007* (2006.01)

(56) References Cited

U.S. PATENT DOCUMENTS

| | | | | |
|---|---|---|---|---|
| 2002/0134149 | A1* | 9/2002 | Shiraishi | G01M 17/02 73/146 |
| 2005/0022587 | A1* | 2/2005 | Tentrup | G01M 13/025 73/116.06 |
| 2013/0160537 | A1* | 6/2013 | Preising | G01M 17/04 73/116.01 |
| 2019/0310162 | A1* | 10/2019 | Pfeiffer | G01M 17/0072 |
| 2022/0402515 | A1* | 12/2022 | Aono | B60W 60/001 |
| 2024/0402696 | A1* | 12/2024 | Hiwatashi | G05B 17/02 |

FOREIGN PATENT DOCUMENTS

| | | |
|---|---|---|
| DE | 102006035502 | 4/2008 |
| DE | 102009060213 | 6/2011 |
| EP | 0338373 | 10/1989 |
| EP | 1037030 | 9/2000 |
| EP | 1596179 | 11/2005 |
| EP | 2161560 | 3/2010 |
| EP | 2602602 | 6/2013 |
| EP | 2796849 | 10/2014 |
| WO | WO 2011/022746 | 3/2011 |
| WO | WO 2016/102555 | 6/2016 |
| WO | WO 2018/104270 | 6/2018 |

OTHER PUBLICATIONS

International Search Report and Written Opinion for International (PCT) Patent Application No. PCT/AT2021/060281, dated Dec. 13, 2021, 13 pages.
English Translation of the International Search Report for International (PCT) Patent Application No. PCT/AT2021/060281, dated Dec. 13, 2021, 2 pages.
International Preliminary Report on Patentability for International (PCT) Patent Application No. PCT/AT2021/060281, dated Nov. 28, 2022, 22 pages.
Notice of Allowance with Machine Translation for Austria Patent Application No. 50688/2020, dated Jan. 10, 2022, 4 pages.

* cited by examiner

TEST BED FOR TESTING A REAL TEST OBJECT IN DRIVING OPERATION

CROSS REFERENCE TO RELATED APPLICATIONS

This application is a national stage application under 35 U.S.C. 371 and claims the benefit of PCT Application No. PCT/AT2021/060281 having an international filing date of 12 Aug. 2021, which designated the United States, which PCT application claimed the benefit of Austria Patent Application No. A50688/2020 filed 14 Aug. 2020, the disclosures of each of which are incorporated herein by reference in their entireties.

FIELD OF THE INVENTION

The invention relates to a test bed for testing a real test object in driving operation, wherein the test object is a real component of a vehicle which is capable of applying torque to a wheel hub, wherein the test bed comprises a load machine configured to be connected to the wheel hub so as to transmit torque, and wherein the test bed has an actuator configured to generate a relative movement between the wheel hub on the one hand and a vehicle frame supporting the wheel hub on the other. The invention also relates to a corresponding method for testing a real test object.

BACKGROUND

At least individual components of a motor vehicle's drive train can be tested on vehicle test beds or drive train test beds. Depending on which component or components are being tested, a chassis test bed, an engine test bed, a transmission test bed, etc. are thereby used in the process.

A test object, thus the apparatus to be tested, is thereby subjected to a test run in order to assess the test object's properties. So as to achieve this, specific measured variables are recorded during a test run by suitable measurement sensors and subjected to a test run in real time or following a delay in order to analyze the test object's properties. So as to achieve this, specific measured variables are recorded by suitable measurement sensors during a test run and evaluated in real time or following a delay (post-mortem).

A real test object is thereby a combination of a number of real components, whereby the real components are assembled on the test bed as actual physical components. The test bed or a separate simulation device uses simulation models to simulate, particularly in real time, vehicle components which are not physically present as virtual components. This thereby supplementarily expands the real test object into a complete system.

The real test object (real unit under test—rUUT), which comprises the real components can preferably be supplemented by a virtual test object (virtual unit under test—vUUT) comprising the virtual components. The virtual test object is thereby preferably formed by the test bed.

A motor vehicle, a drive train or even just smaller systems such as a power pack, a hybrid drive or even a transmission are examples of test objects.

The test run is a chronological sequence of the regulated states of the test object on the test bed by means of control or regulation provided by an electronic control unit.

In the case of a drive train test bed, the real test object is connected to a load machine which loads the test object pursuant to the test run, e.g. a positive or negative load torque or engine speed, or a differently defined load condition. The real test object is operated according to the specifications of the test run under said load or said load condition.

For example, an internal combustion engine and a transmission can be physically present on the test bed, wherein the transmission is mechanically coupled to the load machine, preferably via a transmission output.

The internal combustion engine and the transmission are then driven pursuant to a test run, for example by an adjustment of the internal combustion engine's throttle valve, by stipulation of the gear or by setting of a specific engine speed at the transmission output.

The load machine is controlled by target torques $M_{Soll}(t)$ or target engine speeds $N_{Soll}(t)$ which vary over time resulting in a test object load or load condition respectively.

The course of the target torque $M_{Soll}(t)$ or target engine speed $N_{Soll}(t)$ thereby depends on the operating points specified in the test run for testing. Furthermore, when determining these target torques $M_{Soll}(t)$ or target engine speeds $N_{Soll}(t)$, properties of virtual components such as, for example, shafts, differential, axle, tires as well as the interaction with the vehicle's environment, e.g. the contact between the tires and the simulated test track and the weather, can be simulated via simulation models.

Parameters which vary over time, in particular engine speeds, torques, forces and positions, are relayed to the interfaces between the real components and the virtual components, preferably in real time.

A particular challenge is mapping dynamic systems and processes on such a test bed.

Document WO 2011/022746 A1 relates to regulation of a test bed arrangement containing a test piece, e.g. an internal combustion engine or a vehicle drive train, which has at least one angle of rotation as the output and is connected to at least one load unit via at least one connecting shaft. A target value of the torque of the connecting shaft is calculated as the output value in an impedance model describing the mechanical resistance of the test piece using input variables derived from the test piece and this target value is used as a basis for regulating the torque of the load unit.

Document EP 0 338 373 relates to a test bed for testing the drive train of a vehicle, wherein at least two independent torque-controlled electric load machines are flange-mounted directly to the shafts of the drive train to be tested. A simulation computer simulates the road resistance, the wheels and the vehicle acceleration behavior excluding the components actually physically present as real vehicle components such as the main drive train, axle gearing, shafts, clutch, transmission, combustion engine. Simulations of cornering, spinning wheels, different wheel radii and spinning or locking wheels are possible.

SUMMARY OF THE INVENTION

It is a task of the invention to provide an improved test bed and an improved method for testing a real test object. A particular task of the invention is that of enabling simulation of the interaction of the wheels with a test track road surface in driving operation on a test bed.

This task is solved by a test bed and a method for testing a real test object according to the independent claims. Advantageous embodiments are indicated in the subclaims.

A first aspect of the invention relates to a test bed for testing a real test object in driving operation, wherein the test object has at least one real component of a vehicle capable of applying torque to a wheel hub, and wherein the test bed comprises:

a load machine configured to be connected to the wheel hub so as to transmit torque;

an actuator configured to generate a relative movement between the wheel hub on the one hand and a vehicle frame supporting the wheel hub on the other;

simulation means for simulating the driving operation, wherein the simulation means is configured to simulate a virtual wheel and dynamics of the virtual wheel as if it were arranged on the wheel hub; and control means configured to operate the real test object in consideration of the simulated dynamics of the virtual wheel on the test bed.

In particular, no real test object wheel is mounted on the wheel hub. Preferably, the test object does not have a real wheel.

Preferably, the test bed further comprises an interface, in particular a data interface, via which operating parameters of the test bed and/or the real test object can be output. Operating parameters can thereby preferably be measured actual values or target values.

A second aspect of the invention relates to a method for testing a real test object having a real component of a vehicle capable of applying torque to a wheel hub on a test bed comprising a load machine and an actuator, wherein the method comprises the following work steps:

simulating travel of the vehicle on a virtual test track via a vehicle model which maps at least one virtual wheel, in particular its dynamics, and other components of the vehicle not actually physically present, wherein at least target values for a torque or an engine speed of the load machine and target values for a, particularly vertical, force or position of the actuator are determined;

providing a torque or engine speed to the wheel hub via the load machine and a, particularly vertical, force or position to the wheel hub via the actuator as a function of the respective simulated target values;

operating the real test object, in particular the real component able to apply torque to the wheel hub, on the test bed such that the test object travels along the virtual test track; and measuring actual values of the engine speed and/or the torque at the wheel hub and/or measuring actual values of the, in particular vertical, force and/or position of the wheel hub, wherein at least those parameters of the parameter pair of engine speed and torque or the parameter pair of force and position for which no target values were determined are measured in each respective case.

Preferably, the method is computer-implemented.

Preferably, operating parameters of the test bed and/or real test object are output by means of an interface, in particular a data interface. Operating parameters can thereby preferably be measured actual values or target values.

Preferably, no actual wheels are mounted on the wheel hub(s). Further preferably, the operation of the wheels and/or their dynamics is exclusively a simulation.

A third aspect of the invention relates to a measuring arrangement comprising a test bed and a real test object installed on the test bed and at the least comprising the real component of the vehicle capable of applying torque to a wheel hub.

Further aspects of the invention relate to a computer program comprising instructions which, when executed by a computer, prompt it to execute the method steps according to the second aspect of the invention, and a computer-readable medium on which such a computer program is stored.

Within the meaning of the invention, a component of a vehicle which is capable of applying torque to a wheel hub is preferably a braking device or a drive train.

A drive train within the meaning of the invention is preferably an assemblage of components which serve in moving the vehicle using the power generated by the engine. The drive train preferably includes the components of engine, starting elements, transmission, drive shaft and axle differential.

A wheel within the meaning of the invention preferably comprises a rim and a tire.

A wheel hub within the meaning of the invention is preferably a rotatable flange. Further preferably, a shaft of the load machine is or can be rotationally fixed to the wheel hub. Further preferably, the wheel hub is designed to form the center of a wheel and have the wheel attached thereto. Further preferably, the wheel hub is rotationally fixed to a braking element on which a braking device acts. Further preferably, the wheel hub is part of the real test object or the test bed.

A load machine within the meaning of the invention is a dynamometer and/or a brake.

A real test object within the meaning of the invention is preferably an entire vehicle or a component assembly of a vehicle.

A vehicle frame within the meaning of the invention is preferably an apparatus constituting a reference point for the sprung mass of the vehicle. The vehicle frame can thereby be a chassis, particularly an automotive body, or a vehicle itself, but also a frame serving to mount a real test object on the test bed.

Dynamics of a wheel within the meaning of the invention are preferably characterized by torsional vibration frequencies, vibrational frequencies in the vehicle's transverse and longitudinal direction, tire deformation and/or tire curvature.

A virtual test track within the meaning of the invention is preferably a roadway characterized by topology, traffic regulations, traffic signs, signals and/or potential obstacles. Further preferably, a virtual test track is the map of a racetrack.

A target value within the meaning of the invention is preferably a target value or also a target value profile. Preferably, target values take the form of characteristic diagrams and/or functions.

Means within the meaning of the invention is preferably configured as hardware and/or software technology in particular comprising a processing unit, particularly a digital processing unit, in particular a microprocessor unit (CPU), preferably data-connected or signal-connected to a memory or bus system and/or having one or more programs or program modules. Processing includes commands implemented as a program stored in a memory system, detecting input signals from a data bus and/or sending output signals to a data bus. A memory system can comprise one or more, in particular different, storage media, particularly optical, magnetic solid-state and/or other non-volatile media. The program can be provided so as to embody or be capable of performing the methods described herein such that the microprocessor unit can execute the steps of such methods and can thus in particular control and/or regulate a test bed.

The invention is based on the approach of simulating a relative movement between a chassis and wheels during a driving operation as occasioned by the movement of the chassis and the movement of the wheels on the real test object induced by the road surface and concurrently simulating the wheels, in particular their dynamics, on a test bed for simulating driving operation.

To that end, the test bed according to the invention provides for one or more actuators, wherein each actuator is able to exert a force on a wheel hub. Such actuators are also referred to as shakers in the field of test bed technology.

The interaction of load machines for applying torques to the wheel hubs, the actuators for applying lateral forces in the region of the wheel hubs and the simulation of the wheels enables a particularly realistic simulation of the driving operation. Particularly when simulating a driving operation on a racetrack, the invention enables a particularly realistic determination of lap times. Even chassis and drive train changes and their influence on lap times can be analyzed. Particularly advantageously enabled by the inventive test bed and the inventive method is being able to coordinate or respectively calibrate an active wheel suspension and engine control unit (ECU) together on one single test bed. The inventive teaching eliminates the need for a prototype of a vehicle to realize actual driving operation in order to obtain this coordination or calibration.

In one advantageous embodiment of the test bed, the test bed comprises fixing means for fixing the real test object such that relative movement results exclusively from a movement of the wheel hub.

In this advantageous embodiment, the region of the wheel hub, and with it the chassis of the vehicle, which is preferably actually physically present, is stimulated exclusively by the actuators generating a movement of the wheel hub. Preferably, a movement of the vehicle frame, in particular a chassis, is converted into a movement of the actuators via an inverse model; i.e. the movement of the vehicle frame, in particular the chassis, is taken into account by the movement of the actuators.

As a result, no separate actuators moving the vehicle frame or the chassis are required.

In a further advantageous embodiment of the test bed, the simulation means is further configured to simulate a movement of the vehicle frame relative to a roadway, wherein the control means is further configured to factor in the simulated movement of the vehicle frame when controlling the actuator such that the relative movement at least substantially corresponds to a relative movement between the wheel hub and the vehicle frame on the test track.

The movement of the vehicle frame relative to the roadway can thereby be factored in during testing, which yields particularly realistic test results.

In a further advantageous embodiment, the simulation means comprises a tire model in order to take properties of a tire of the virtual wheel into account during simulation, wherein preferably the tire model characterizes a change in the tire, particularly due to the active tire geometry and/or the active tire temperature and/or active tire wear. Simulating the tire, preferably in real time, enables realizing a particularly realistic movement between the wheel hub and the vehicle frame or chassis.

In a further advantageous embodiment of the test bed, the simulation means is configured to use a self-learning algorithm to adapt simulation parameters on the basis of measurement data recorded on the test bed.

A self-learning system is thereby realized which enables the continuous improvement of the simulation. In particular, the learned parameters can be used to improve the inverse model for converting the movement of the vehicle frame or chassis into a movement of the actuators. The learned parameters can also be used for offline simulation.

In a further advantageous embodiment of the test bed, the actuator acts at least substantially in the vertical direction and/or acts in, particularly on, the wheel hub region.

Because the effective direction is vertical, relative movements between the wheels and the vehicle frame/chassis are simulated extremely well. The engagement in the wheel hub region enables a particularly realistic point of application to be realized on the real test object.

In a further advantageous embodiment of the test bed, same has a plurality of load machines and/or actuators, wherein preferably the number of load machines corresponds to the number of wheel hubs to which a torque can be applied via the real component, and/or preferably the number of actuators corresponds to the number of wheel hubs. Preferably, the wheel hubs are thereby provided as real components of the real test object.

This advantageous embodiment enables simulating a vehicle as a whole on the test bed.

In one advantageous embodiment of the method, when simulating the vehicle's travel, target values for a braking force and/or a vehicle acceleration are furthermore determined using the vehicle model, whereby the real test object, in particular the real component of the vehicle capable of applying a torque to the wheel hub, is operated subject to these respective target values.

Factoring in the braking force and/or vehicle acceleration which should respectively be present on the test track achieves a particularly realistic simulation of the driving operation.

In a further advantageous embodiment of the method, a test driver presets target values for a braking force and/or a vehicle acceleration when operating the real test object, whereby the real test object, in particular the real component of the vehicle capable of applying a torque to the at least one wheel hub, is operated subject to these respective target values.

This advantageous embodiment of the invention enables an actual driver to drive along the test track. The driver can thereby preferably be seated in the real test object or in a seatbox. Further preferably, optical and/or acoustic simulation means are provided in order to impart a particularly realistic impression of driving to the driver.

In a further advantageous embodiment of the method, same is performed iteratively, in particular in real time, wherein during each increment of time while simulating the travel, the measured actual values from the preceding increment of time are taken into account.

Closing the control loop enables factoring the behavior of the real test object into the operation of the entire vehicle as a whole. In this case, both the simulated values from the operational simulation of the real test object as well as from the real operational simulation of the vehicle's virtual components as preferably simulated via the test bed are relayed to interfaces. This effects a particularly advantageous coupling of the real test object and the virtual components.

In a further advantageous embodiment of the method, the method moreover comprises the following work step:

adapting simulation parameters on the basis of measurement data recorded on the test bed using a self-learning algorithm.

This enables the continuous improvement of the simulation models employed.

BRIEF DESCRIPTION OF THE DRAWINGS

Further features and advantages are yielded by the following description referencing the figures. Shown therein at least partly schematically.

DETAILED DESCRIPTION

Figure 1:
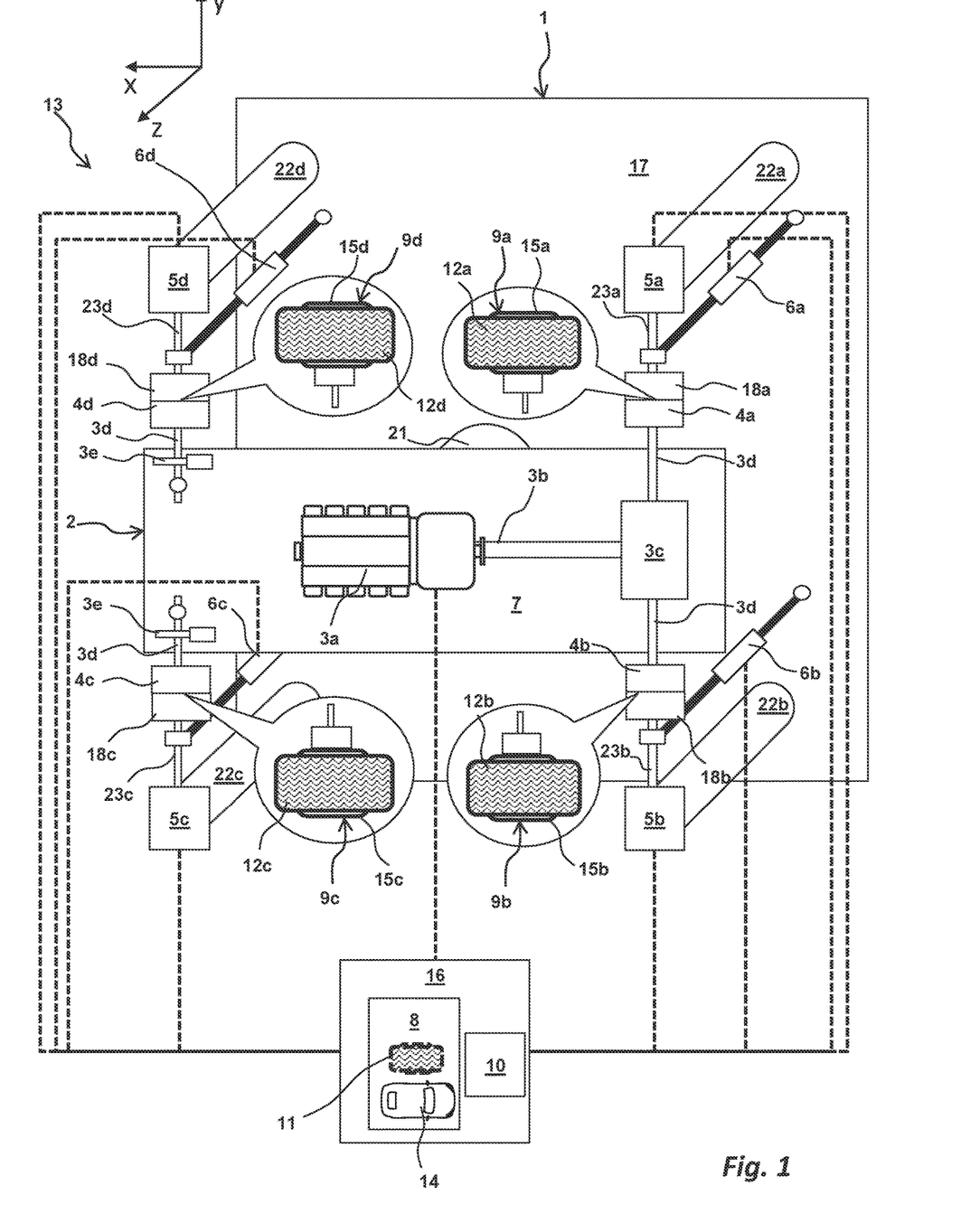
FIG. 1 a perspective plan view of an exemplary embodiment of a measuring arrangement having a test bed and a real test object.

FIG. 1 shows a perspective plan view of a measuring arrangement 13. The measuring arrangement comprises a test bed 1 as well as a real test object 2.

The elements of the test bed 1 are preferably all arranged on a common base 17 which is further preferably formed by a base plate.

Four load machines 5a, 5b, 5c, 5d are supported on the base 17 by means of bearings 22a, 22b, 22c, 22d. Each dynamometer 5a, 5b, 5c, 5d exhibits shafts 23a, 23b, 23c, 23d which connect the dynamometers 5a, 5b, 5c, 5d to preferably existing flanges 18a, 18b, 18c, 18d. The preferably present flanges 18a, 18b, 18c, 18d serve in the rotationally fixed connection to the wheel hubs 4a, 4b, 4c, 4d of the real test object 2.

The shafts 23a, 23b, 23c, 23d are further supported by the actuators 6a, 6b, 6c, 6d.

The base 17 thereby extends in the xy-plane of the plotted xyz-coordinate system.

The bearings 22a, 22b, 22c, 22d extend upward in the vertical z-direction.

The actuators 6a, 6b, 6c, 6d, which support the shafts 23a, 23b, 23c, 23d via bearings, also extend in the z-direction. Via the actuators 6a, 6b, 6c, 6d, a force can be exerted in the vertical z-direction on the shafts 23a, 23b, 23c, 23d, which are preferably flexibly connected both to the dynamometers 5a, 5b, 5c, 5d as well as to the flanges 18a, 18b, 18c, 18d.

The test bed 1 further exhibits an electronic control unit 16 which preferably comprises simulation means 8 and control means 10. Further preferably, the simulation means 8 and the control means 10 can also be arranged in separate electronic control units. Preferably, the control unit 16 or the control units is/are designed as a computer.

As FIG. 1 shows, the electronic control unit 16 is signal-connected to the dynamometers 5a, 5b, 5c, 5d as well as to the actuators 6a, 6b, 6c, 6d of the test bed 1 for signal transmission. Preferably, these elements of the test bed 1 are controlled by the electronic control unit 16. Furthermore, the electronic control unit 16 and the test bed 1 are configured to measure measurement signals on the torque-transmitting unit generated in each case by the shafts 23a, 23b, 23c, 23d, and in their extension, by the respective flanges 18a, 18b, 18c, 18d, wheel hubs 4a, 4b, 4c, 4d and drive shafts 3d. These elements are preferably connected together in rotationally fixed manner. A corresponding measurement signal could for example be transmitted to the electronic control unit 16 via the respective signal connection to the dynamometers 5a, 5b, 5c, 5d.

As previously stated, the control means 10 serves in the controlling of the test bed 1. In addition, the controller 10 can also control unit 3a.

The simulation means 8 preferably comprises a vehicle model 14. In addition, further preferably stored in the simulation means 8 is a tire model 11, which is further preferably part of the vehicle model 14. The simulation means preferably simulates all the components of the vehicle which are not actually physically present on the test bed. In particular, a so-called virtual test object can be simulated by the simulation model.

The real test object 2 preferably comprises a vehicle frame 7, which is further preferably formed as a chassis. Unit 3a, in particular a combustion engine or electric motor, is preferably connected in torque-transmitting manner to a transmission and/or differential 3c via a cardan shaft 3b. The transmission and/or differential 3c is in turn rotationally fixed to wheel hubs 4a, 4b on which wheels 9a, 9b can be mounted via drive shafts 3d.

In the depicted example, the wheel flanges 4a, 4b form the rear axle of a vehicle constituting the real test object 2. All the aforementioned elements which transmit torque to the wheel hubs 4a, 4b are preferably mounted on the vehicle frame 2. Preferably, the unit 3a is thus part of the real test object 2. In principle, however, depending on which components are to be tested, the unit can also be part of the test bed 1 and likewise designed for example as a dynamometer.

The front axle is formed by two pivotable shaft sections 3d which support the wheel hubs 4c, 4d preferably on the chassis 7. The shaft sections 3d are each braked by brakes 3e, in particular disc brakes with brake shoes. The disk brakes 3e can also apply a torque to the wheel hubs 4c, 4d, in this case a braking torque.

The wheel hubs 4a, 4b, 4c, 4d are, as depicted, rotationally fixed to the flanges 18a, 18b, 18c, 18d of the test bed 1. However, it is also alternatively possible for the shafts 23a, 23b, 23c, 23d to act directly on the wheel flanges 4a, 4b, 4c, 4d.

Further preferably, it is possible for the wheel flanges 4a, 4b, 4c, 4d to be part of the real test object 2 or the test bed 1. Additionally or alternatively, the vehicle frame 7 can also be part of the test bed. In that case, the real components 3a, 3b, 3c, 3e, 3d are mounted on the vehicle frame 7 of the test bed 1.

The vehicle frame 7 is preferably likewise securely fixed to the base 17 via fixing means 21. In particular, the fixing means 21 are configured such that the vehicle frame or chassis 7 respectively is at least substantially unable to move relative to the base 17.

As previously stated, the simulation means 8 preferably comprises a tire model 11 and a vehicle model 14. The simulation means 8 serves in particular in simulating those components of the vehicle not physically present on the test bed, in particular a so-called virtual test object.

At least wheels 9a, 9b, 9c, 9d are simulated in the depicted exemplary embodiment. Preferably, the wheels thereby comprise a wheel rim 15a, 15b, 15c, 15d, which is generally rigid, and the tire 12a, 12b, 12c, 12d. The dynamics of the wheels 9a, 9b, 9c, 9d are thereby simulated in the simulation means 8 by means of virtual wheels as if they were affixed to the edge flanges 4a, 4b, 4c, 4d of the real test object 2.

Figure 2:
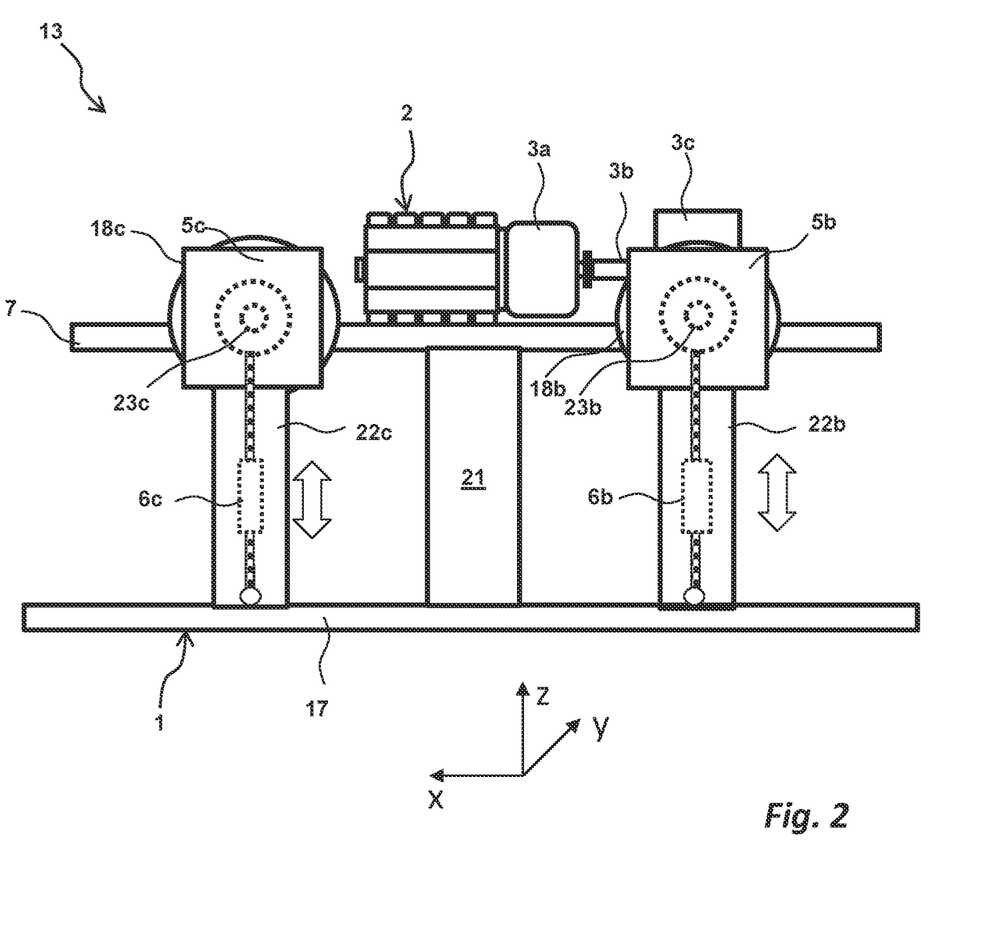
FIG. 2 a side plan view of the exemplary embodiment of a measuring arrangement according to FIG. 1.

FIG. 2 shows a side view of the exemplary embodiment of the measuring arrangement 13 from FIG. 1 in a plan view in the y-direction of the depicted coordinate system.

Reference is made to FIG. 1 with respect to the description of the individual elements shown in FIG. 2.

Dotted lines are used to depict the actuators 6b, 6c as well as the shafts 23b, 23c of the test bed 1 since they are technically hidden behind the bearings 22b, 22c and the dynamometers 5b, 5c in the FIG. 2 view.

The double arrows shown in FIG. 2 indicate that the depicted actuators 6b, 6c can exert a force on the shafts 23b, 23c of the test bed 1 in the z-direction in order to induce a relative movement of the virtual wheels 9b, 9c (not shown) relative to the vehicle frame or chassis respectively.

Figure 3:
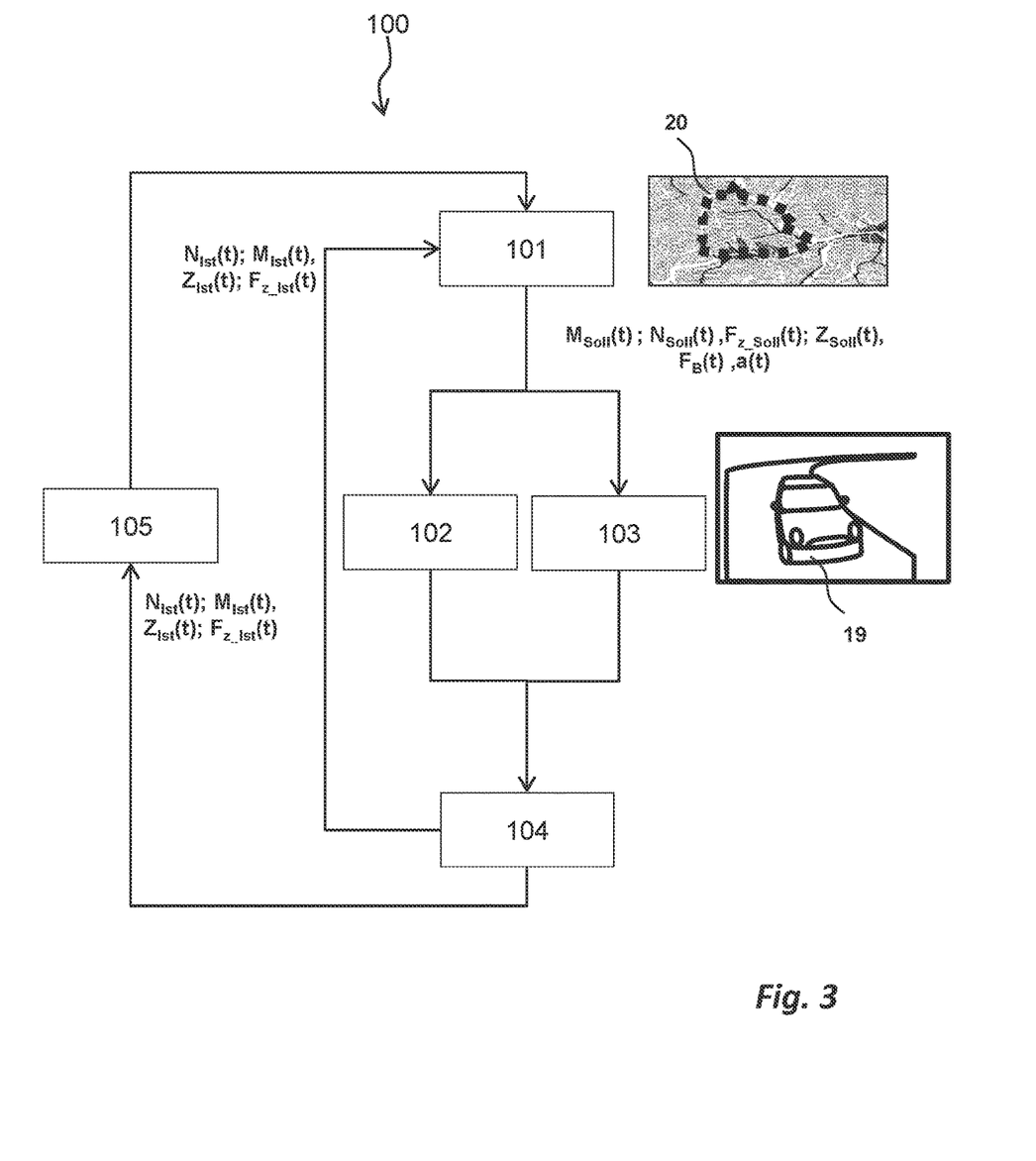
FIG. 3 an exemplary embodiment of a method for testing a real test object.

FIG. 3 shows an exemplary embodiment of the inventive method 100 for testing a real test object 2.

In a first work step 101, the travel of the vehicle 19 on a virtual test track 20 is simulated.

The vehicle model 14, in particular utilizing a tire model 11, models the virtual components of the vehicle 19, in particular the dynamics of the virtual wheels 9a, 9b, 9c, 9d (not shown). Target values are thereby calculated for a torque $M_{Soll}(t)$ or an engine speed $N_{Soll}(t)$ for the dynamometers 5a, 5b, 5c, 5d (not shown). Furthermore, target values for a braking force $F_B(t)$ and/or a vehicle acceleration a(t) are preferably determined during the simulation via the vehicle model 14.

In a second work step 102, the test bed 1, in particular its dynamometers 5a, 5b, 5c, 5d and actuators 6a, 6b, 6c, 6d (neither shown), is controlled on the basis of the simulation such that the dynamometers 5a, 5b, 5c, 5d provide a torque subject to the target value of the torque $M_{Soll}(t)$ or an engine speed subject to the target value of the engine speed $N_{Soll}(t)$. The same applies to the actuators 6a, 6b, 6c, 6d (not shown) which provide a force based on the target value $F_{Z\_Soll}(t)$ or set the wheel hubs 5a, 5b, 5c, 5d (not shown) and/or the shafts 23a, 23b, 23c, 23d (not shown) to a defined position subject to the target value $Z_{Soll}(t)$.

In a third work step 103, the real test object 2, in particular the real component 3 capable of applying a torque to the wheel hubs 4a, 4b, 4c, 4d (neither shown), is operated such that a simulated vehicle 19 drives along a virtual test track 20. Preferably, the target values for the braking force $F_B(t)$ and/or the target value for the vehicle acceleration a(t) preferably likewise calculated in the simulation are thereby used in order to control a drive motor 3a and/or one or more braking devices 3e of the real test object 2.

The second and third work steps 102, 103 preferably run simultaneously.

Alternatively, the target values for the braking force $F_B(t)$ and/or vehicle acceleration a(t) can also be preset by a test driver.

In a fourth work step 104, the actual values of the engine speed $N_{Ist}(t)$ or the torque $M_{Ist}(t)$ are measured in the region of the at least one wheel hub 4a, 4b, 4c, 4d (not shown). The torque can thereby in principle be measured on one of the elements rotationally fixed to the wheel hub 4a, 4b, 4c, 4d, as depicted in FIG. 1.

Preferably, an actual value of the force on the wheel hub 4a, 4b, 4c, 4d (not shown) in the z-direction $F_{Z\_Ist}(t)$ or the position $Z_{Ist}(t)$ of the wheel hub 4a, 4b, 4c, 4d (not shown) in the z-direction is alternatively or additionally also measured.

Measured from the parameter pair of engine speed and torque $N_{Ist}(t)$, $M_{Ist}(t)$ and the parameter pair of force and position $Z_{Ist}(t)$, $F_{Z\_Ist}(t)$ is at least those respective parameters for which no target values were determined in the simulation and which were therefore also not predefined by the test bed or the electronic control unit 16 respectively (neither shown).

Preferably, simulation parameters are adapted in a further work step 105 on the basis of measurement data recorded on the test bed 1 (not shown) using a self-learning algorithm. In particular, the measured actual values are thereby used.

Further preferably, the method 100 is performed iteratively, in particular in real time. Preferably, during each increment of time while simulating the travel in work step 101, the measured actual values $N_{Ist}(t)$, $M_{Ist}(t)$, $Z_{Ist}(t)$, $F_{Z\_Ist}(t)$ from the preceding increment of time are thus taken into account. Preferably, a closed control loop is formed in which the target values and the actual values have a mutual influence on each other. So doing enables taking into account that parameters which change over time, in particular engine speeds, torques, forces and positions, are relayed to the interfaces between the real components and the virtual components in real time.

The exemplary embodiments described above are only examples which are in no way intended to limit the scope of protection, application and configuration of the invention. Rather, the foregoing description is to provide the person skilled in the art with a guideline for implementing at least one exemplary embodiment, whereby various modifications can be made, particularly as regards the function and arrangement of the described components, without departing from the scope of protection resulting from the claims and from equivalent combinations of features.

LIST OF REFERENCE NUMERALS 1 test bed
2 real test object
3a, 3b, 3c, 3d, 3e, 3f real component of a vehicle
4a, 4b, 4c, 4d wheel hub
5a, 5b, 5c, 5d load machine
6a, 6b, 6c, 6d actuator
7 vehicle frame
8 simulation means
9a, 9b, 9c, 9d virtual wheel
10 control means
11 tire model
12a, 12b, 12d, 12c, 12d tire
13 measuring arrangement
14 vehicle model
15a, 15b, 15d wheel rim
16 electronic control unit
17 base
18a, 18b, 18c, 18d flange
19 vehicle
20 test track
21 fixing means
22a, 22b, 22c, 22d bearing
23a, 23b, 23c, 23d shaft
$M_{Soll}(t)$ target torque value
$N_{Soll}(t)$ target engine speed value
$F_{Z\_Soll}(t)$ target value of a force in the z-direction
$Z_{Soll}(t)$ target value of the position in the z-direction
$F_B(t)$ target braking force value
a(t) target acceleration value
$N_{Ist}(t)$ actual engine speed value
$M_{Ist}(t)$ actual torque value
$Z_{Ist}(t)$ actual value of the position in the z-direction
$F_{Z\_Ist}(t)$ actual value of the force in the z-direction

What is claimed is:

1. A test bed for testing a real test object in driving operation, wherein the real test object has at least one real component of a vehicle which is capable of applying torque to a wheel hub, and wherein the test bed comprises:
a load machine which is configured to be connected to the wheel hub so as to transmit torque;
an actuator which is configured to generate a relative movement between the wheel hub on the one hand and a vehicle frame supporting the wheel hub on the other;
simulation means for simulating the driving operation, wherein the simulation means is configured to simulate a virtual wheel and dynamics of the virtual wheel, characterized by torsional vibration frequencies, vibrational frequencies in the vehicle's transverse and longitudinal direction, tire deformation and/or tire curvature, as if it were arranged on the wheel hub; and control means configured to operate the real test object in consideration of the simulated dynamics of the virtual wheel on the test bed.

2. The test bed according to claim 1, wherein the test bed comprises fixing means in order to fix the real test object such that the relative movement results exclusively from a movement of the wheel hub.

3. The test bed according to claim 1, wherein the simulation means is further configured to simulate a movement of the vehicle frame relative to a roadway, wherein the control means is further configured to factor in the simulated movement of the vehicle frame when controlling the actuator such that the relative movement at least substantially corresponds to a relative movement between the wheel hub and the vehicle frame on the roadway.

4. The test bed according to claim 1, wherein the simulation means comprises a tire model in order to take properties of a tire of the virtual wheel into account during simulation, wherein preferably the tire model characterizes a change in the tire, particularly due to the active tire geometry and/or the active tire temperature and/or active tire wear.

5. The test bed according to claim 1, wherein the simulation means is further configured to adapt simulation parameters on the basis of measurement data recorded on the test bed using a self-learning algorithm.

6. The test bed according to claim 1, wherein the actuator acts at least substantially in the vertical direction and/or acts in, particularly on, the region of the wheel hub.

7. The test bed according to claim 1 having a plurality of load machines and/or actuators, wherein preferably the number of load machines corresponds to the number of wheel hubs to which a torque can be applied via a real component of the real test object, and/or preferably the number of actuators corresponds to the number of wheel hubs.

8. A measuring arrangement comprising a test bed according to claim 1 and the real test object which is installed on the test bed and which at the least comprises the real component of the vehicle capable of applying torque to a wheel hub.

9. A method for testing a real test object having a real component of a vehicle capable of applying torque to a wheel hub on a test bed comprising a load machine and an actuator, wherein the method comprises the following work steps:

simulating travel of the vehicle on a virtual test track via a vehicle model which maps a virtual wheel, in particular its dynamics, and other components of the vehicle which are not actually physically present, wherein at least target values for a torque ($M_{Soll}(t)$) or an engine speed ($N_{Soll}(t)$) of the load machine and target values for a, particularly vertical, force ($F_{z\_Soll}(t)$) or position ($Z_{Soll}(t)$) of the actuator are determined;

providing a torque or engine speed to the wheel hub via the load machine and a, particularly vertical, force or position to the wheel hub via the actuator as a function of the respective simulated target values ($M_{Soll}(t)$; $N_{Soll}(t)$, $F_{z\_Soll}(t)$; $Z_{Soll}(t)$);

operating the real test object, in particular the real component able to apply torque to a wheel hub, on the test bed such that the vehicle travels along the virtual test track; and measuring actual values of the engine speed ($N_{Ist}(t)$) and/or the torque ($M_{Ist}(t)$) at the wheel hub and/or measuring actual values of the, in particular vertical, force ($F_{z\_Ist}(t)$) and/or position ($Z_{Ist}(t)$) of the wheel hub, wherein at least those parameters of the parameter pair of engine speed and torque ($N_{Ist}(t)$; $M_{Ist}(t)$) or the parameter pair of force and position ($Z_{Ist}(t)$; $F_{z\_Ist}(t)$) for which no target values were determined are measured in each respective case.

10. The method according to claim 9, wherein target values for a braking force ($F_B(t)$) and/or a vehicle acceleration ($a(t)$) are furthermore determined via the vehicle model during the simulating of the vehicle's travel, wherein the real test object, in particular the real component of the vehicle capable of applying a torque to the wheel hub, is operated subject to these respective target values.

11. The method according to claim 9, wherein a test driver presets target values for a braking force ($F_B(t)$) and/or a vehicle acceleration ($a(t)$) when operating the real test object, wherein the real test object, in particular the real component of the vehicle capable of applying a torque to the at least one wheel hub, is operated subject to these respective target values.

12. The method according to claim 9 performed iteratively, in particular in real time, wherein during each increment of time while simulating the travel, the measured actual values ($N_{Ist}(t)$; $M_{Ist}(t)$, $Z_{Ist}(t)$; $F_{z\_Ist}(t)$) from the preceding increment of time are taken into account.

13. The method according to claim 9 further comprising the following work step:

adapting simulation parameters on the basis of measurement data recorded on the test bed, in particular the measured actual values ($N_{Ist}(t)$; $M_{Ist}(t)$, $Z_{Ist}(t)$; $F_{z\_Ist}(t)$), using a self-learning algorithm.

14. A computer program comprising instructions which, when executed by a computer, prompt it to execute the steps of a method according to claim 9.

15. A computer-readable medium on which a computer program according to claim 14 is stored.

* * * * *